(12) United States Patent
Hott (10) Patent No.: US 6,665,568 B1
(45) Date of Patent: Dec. 16, 2003

(54) INTERNET WIDE DISTRIBUTED DATA CONTROL SYSTEM

(76) Inventor: Brandt P. Hott, P.O. Box 482, Pinedale, WY (US) 82941

( * ) Notice: Subject to any disclaimer, the term of this patent is extended or adjusted under 35 U.S.C. 154(b) by 0 days.

(21) Appl. No.: 09/913,053

(22) PCT Filed: Feb. 16, 2000

(86) PCT No.: PCT/US00/04022

§ 371 (c)(1),
(2), (4) Date: Aug. 6, 2001

(87) PCT Pub. No.: WO00/49471

PCT Pub. Date: Aug. 24, 2001

Related U.S. Application Data (60) Provisional application No. 60/120,426, filed on Feb. 16, 1999.

(51) Int. Cl.[7] .............................................. G06F 19/00
(52) U.S. Cl. .......................... 700/95; 700/83; 345/744
(58) Field of Search ............................... 700/17, 83, 9, 700/108, 174, 95, 184, 100; 345/744, 762, 777

(56) References Cited

U.S. PATENT DOCUMENTS

| | | | | | |
|---|---|---|---|---|---|
| 5,973,696 | A | * | 10/1999 | Agranat et al. | 345/760 |
| 5,982,362 | A | | 11/1999 | Crater et al. | 345/327 |
| 6,138,150 | A | * | 10/2000 | Nichols et al. | 709/219 |
| 6,170,007 | B1 | * | 1/2001 | Venkatraman et al. | 709/218 |
| 6,201,996 | B1 | * | 3/2001 | Crater et al. | 700/9 |
| 6,311,101 | B1 | * | 10/2001 | Kastner | 700/197 |

* cited by examiner

*Primary Examiner*—Leo Picard
*Assistant Examiner*—Kidest Bahta
(74) *Attorney, Agent, or Firm*—TraskBritt (57) ABSTRACT

A system for the real-time monitoring of variables in production processes and in production systems and for controlling and manipulating the variables through the remote control of process equipment. Both the monitoring and control functions are available through the Internet, thereby providing control and monitoring of remotely located field equipment without direct human contact.

14 Claims, 3 Drawing Sheets

INTERNET WIDE DISTRIBUTED DATA CONTROL SYSTEM

PRIORITY CLAIM

This application claims the benefit of the filing date of U.S. Provisional Patent Application Serial No. 60/120,426, filed Feb. 16, 1999, for "INTERNET WIDE DISTRIBUTED DATA CONTROL SYSTEM".

TECHNICAL FIELD

This invention relates generally to control systems for oil and gas fields and other processing operations. More particularly, the invention pertains to a computer control system which allows a user to access real-time, and historical data from oil, gas, or other liquid well sites, manipulate operations and production control systems in real time and produce reports detailing the data collected at various well sites, all by way of, for example, an Internet or modem connection.

BACKGROUND

Many process and production industries require operation facilities to be located in remote locations. Oftentimes the location of a particular facility is dictated by the resources available at a given site, e.g. oil, gas or mineral deposits. In other instances, the nature of the process to be effected in the facility dictates that the facility be located remote from populated areas. Effective operation of such facilities in extremely remote and perhaps environmentally hostile locations creates numerous logistical and operational problems. These problems are exacerbated if the equipment at the facility site requires monitoring and adjustment to meet changing conditions at the work site. In many cases it is difficult to maintain an on site presence of human operators for these monitoring and adjustment functions due to hostile environmental conditions. Notwithstanding these difficulties it is recognized that the continued operation of facilities at many remote and hostile locations is highly desirable.

There exists a need for a system which is capable of monitoring the operational characteristics of equipment in one or more remote facilities and thereafter efficiently transmitting selected data concerning those operational characteristics to a control center located spatially distant from the facilities. The desired system should facilitate processing of the transmitted data sufficiently to permit competent decision-making at the control center regarding the operation of the facilities. The system should also be capable of permitting the control center to remotely adjust the equipment at the facilities in order to achieve desired operational characteristics.

DISCLOSURE OF INVENTION

The current invention provides a system for the real-time monitoring of variables such as temperature, flow rates, volumetric flow, pressure, pressure drops, chemical composition, pH, and the like in production processes and in production systems. Furthermore, the invention provides a system for controlling and manipulating the variables through the control of process equipment. Both the monitoring and control functions are available over the Internet, thereby providing a control and monitoring functions over field equipment located in remote areas may be operated without direct human contact.

The invention includes a computer system for the monitoring and querying of remote sensing equipment and the issuing and verifying of control commands. The invention also includes communication devices with which the computer system is able to communicate with remotely located field equipment. Such communication devices include cellular links, microwave relays and hops, radio links, cable links, satellite links, routers, and the like. The communication devices provide a link between the computer system and the physical monitoring and control equipment in the field. Through the communication devices, the computer system is able to open and close valves, start or shut-down mechanical equipment, monitor readings from sensing devices and perform any of a number of necessary monitoring and control functions.

BEST MODES FOR CARRYING OUT THE INVENTION

The Internet Wide Distributed Data Control System (IW-DDCS) is a computer control system which enables a client to access historical and real-time data pertinent to process production, such as oil and gas production, by way of a remote connection using the Internet. Both pre-defined and client-prompted data requests may be received and processed by the IW-DDCS system. In addition, the IW-DDCS system provides a client access to control functions capable of manipulating process equipment and field instruments, such as valves, pumps, wells and the like, and altering production variables, such as flow rates, pressure drops and the like.

Although the IW-DDCS system may be used for most process oriented production systems, the following descriptions of the Best Modes for Carrying out the Invention will focus on the use of the IW-DDCS system within the oil and gas production industry.

The data collection and control functions provided to a client by the IW-DDCS system enable the client to monitor and control oil and gas well sites from a remote location which were, heretofore, only accessible by persons located at the well location. Thus, use of the IW-DDCS system allows a central facility to monitor and control numerous well and production sites from a single location anywhere in the world as long as that location has access to the Internet. Likewise, a technician in the field with access to a portable computer and an Internet connection could also monitor and control production variables.

Figure 1:
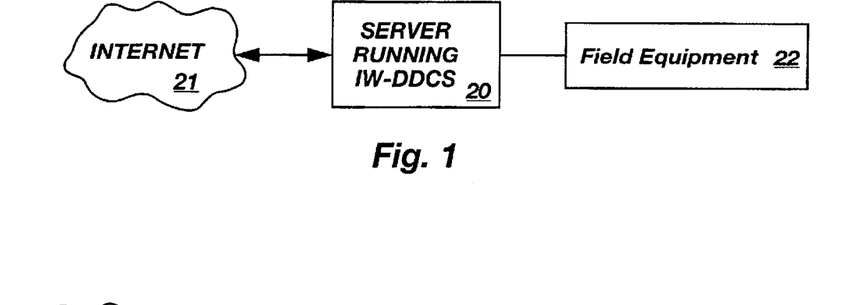
FIG. 1 illustrates a simple block diagram of a server computer using the Internet Wide Distributed Data Control System (IW-DDCS) in combination with external components.

A simplified schematic of the fW-DDCS communication with the Internet and field equipment is illustrated in FIG. 1. A server 20 running the IW-DDCS is capable of connecting to both the Internet 21 and field equipment 22. The field equipment 22 may be local equipment hardwired into the server 20 or other processing computer, or the field equipment 22 may be remote equipment linked to a computer or other device capable of communicating with the Internet 21 or the server 20. Although the IW-DDCS system described herein is customized for the oil and gas industry, it is understood that the IW-DDCS system may be altered so that it may be applied in other industries. For example, just as the IW-DDCS system is capable of controlling the operations of an oil and gas well, it could be used to control the operations of a chemical plant. Alternatively, the IW-DDCS system could be modified to control any piece of equipment which is capable of computer control.

A client having access to the Internet 21 may communicate with the server 20 by directing a standard web-browser (e.g., INTERNET EXPLORER™, NETSCAPE NAVIGATOR™, MOSAIC™) or an customized IW-DDCS Internet browser, to the Internet domain address (ip-address) of the server 20. In such a situation, a connection accessing the server 20 is typically referred to as the client because the server 20 treats the party as a client. In other words, a client browsing the server 20 acts just as a client browsing a store would. Some of the server's 20 resources are dedicated to the client and the client may access information on the server 20.

Accessing the server 20 with a web-browser prompts the IW-DDCS to mimic a web-browser for all communications with the client. Access by way of an IW-DDCS component system prompts the IW-DDCS to act as a server using a TCP/IP or equivalent connection. It is understood that connection by way of an Internet may also include connection through the world-wide-web, through ftp protocols, or the like.

The server 20 connects to the field equipment 22 through standard communications ports available to the server 20. Communications between the server 20 and the Internet 21 occur over dedicated ports typically using the TCP/IP protocol, however, use of other protocols, such as UDP, for Internet and remote connections are also within the realm of the present invention. Remote connections to the field equipment 22 may be accomplished through land lines, radio frequencies, microwave frequencies, satellite uplinks or other forms of communication common in the communication arts.

Figure 2:
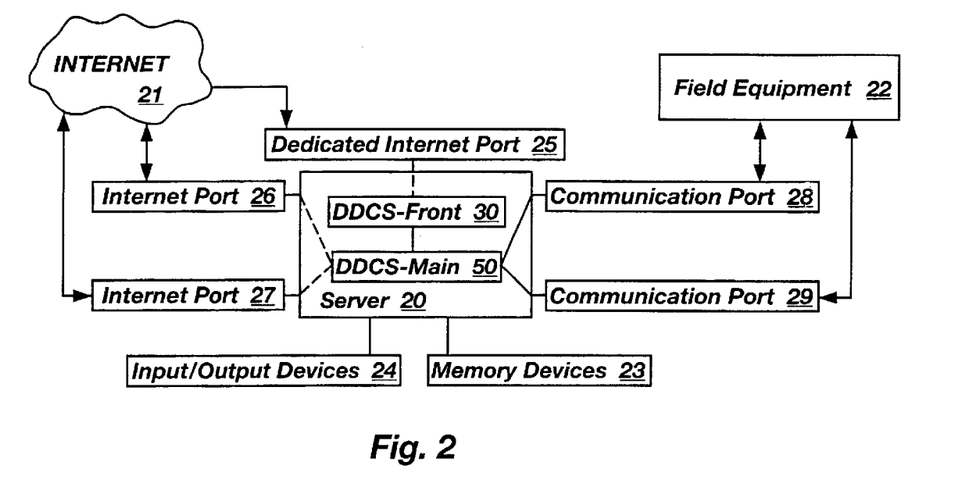
FIG. 2 illustrates a block diagram of a typical server system running the IW-DDCS.

FIG. 2 illustrates a server 20 running the IW-DDCS. The IW-DDCS comprises two distinct components, the DDCS-Front 30 (Distributed Data Control System—Front) and the DDCS-Main 50 (Distributed Data Control System—Main), which will be discussed in further detail below.

The server 20 has a dedicated Internet port 25 associated with an Internet domain address for communications over the internet. Likewise, the server 20 may be connected to a company Intranet or Local Area Network instead of, or in addition to, the Internet. The IW-DDCS 'listens' to the Internet 21 through the dedicated Internet port 25, waiting for incoming connection requests from clients attempting to access the server 20 by way of the Internet 21. Once a connection is established between the server 20 and the Internet 21, the dedicated Internet port 25 connects the client to the IW-DDCS component DDCS-Front 30.

The server 20 is also equipped with at least one additional Internet port 26 to provide communication abilities between the IW-DDCS component DDCS-Main 50 and the Internet 21. Although FIG. 2 illustrates two Internet ports, 26 and 27 respectfully, it is understood that the server 20 may communicate through a plurality of additional Internet ports.

The server 20 also has at least one communication port 28 such that the IW-DDCS component DDCS-Main 50 may communicate with field equipment 22 located at local and remote locations. Although FIG. 2 only illustrates two communication ports 28 and 29 respectfully, it is understood that the server 20 may be equipped with additional communication ports capable of communicating with field equipment 22 located in multiple locations.

In addition, the server 20 will typically be equipped with memory devices 23 and input/output devices 24. Memory devices 23 may include, but are not limited to, internal or external devices such as hard disk drives, compact disc readers and writers, digital video disk readers and writers, optical storage units, ZIP™ disk drives, floppy disk drives, tape data storage systems, and the like. Typical input/output devices 24 include, but are not limited to, keyboards, mouse units, voice recognition, pen units, optical and digital scanners, and the like.

In a presently preferred embodiment, the IW-DDCS is designed to run on a server 20 having two INTELI® Pentium II four hundred and fifty megahertz (450 Mhz) processors, one gigabyte of memory and two, thirty two (32) gigabyte SCSI Seagate hard disk drives, using the Microsoft® Windows NT Server 4.0 operating system. A dedicated Internet port 25 used by the server 20 is setup as port eighty (80), the default port for Internet communications. DDCS-Front 30 is bound to port 80 and assigned a known Internet ip-address. DDCS-Main 50 typically binds to a client using a port in the range of 1200 to 7000. Communication port 28, known as communications port number two (Com port #2) on the server 20 is typically connected to a radio (not shown) for communications with field equipment 22.

Although the previously described server 20 is ideally suited for running the IW-DDCS, it is understood that the IW-DDCS may also operate effectively on any server 20 having the capability to communicate with the Internet 21 and remote field equipment 22.

Figure 3:
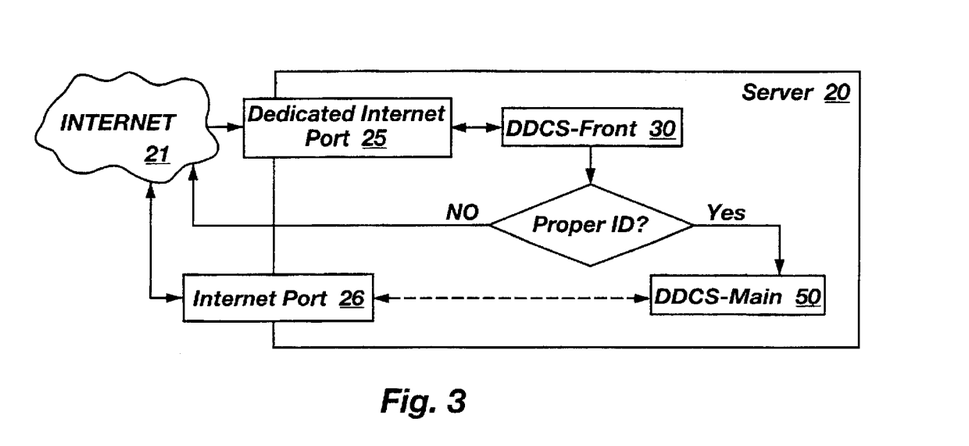
FIG. 3 illustrates a block diagram of the initial log-in sequence to the IW-DDCS.

FIG. 3 is a block diagram of the log-in sequence performed by the IW-DDCS upon a request from a client accessing the server 20.

Any request from the Internet 21 by a client to operate the IW-DDCS is communicated through the dedicated Internet port 25 to the server 20. Once a request is received by the server 20, the server 20 passes the Internet domain and port address of the client to the IW-DDCS component DDCS-Front 30 for a log-in authentication process. The log-in authentication process obtains pertinent information about the client in order to determine whether or not the client has permission to access the IW-DDCS components.

DDCS-Front 30 prompts the client for the client's user name and password. The prompt is communicated between the server 20 and the client's computer through the dedicated Internet port 25. The client must enter this information, and submit it to the server 20 and DDCS-Front 30 if they wish to attempt to access the IW-DDCS. This information is typically known as the client's 'identification' or 'ID' as indicated in FIG. 3. Upon receiving the required information from the client, DDCS-Front 30 attempts to authenticate the client identification, comparing the user name and password to internally or externally stored client information. DDCS-Front 30 may also provide access to the client information to an authorized user for the purposes of changing or altering the status, or level of access, provide to each individual client. For example, a network administrator may have access to DDCS-Front 30, including the ability to access client information in order to grant or revoke client privileges.

The IW-DDCS may have alternate levels of access which it provides to various clients. Some clients may only be allowed access to certain components of IW-DDCS depending upon their status. For example, individuals wishing to monitor production rates for the purpose of determining whether or not to invest in a well may be given access to view only production data from a well, whereas, a client who owned a well may be given access to both the monitoring components of IW-DDCS as well as the control components of IW-DDCS. In addition, the entire log-in process is capable of being encrypted or protected such that the client information and identification may not be monitored by other parties using the Internet or attempting to obtain the client information.

An invalid log-in attempt results in DDCS-Front 30 informing the client of the failed log-in and terminating the communications session. In those cases where the client's log-in information is validated, where the client has permission to use the IW-DDCS, DDCS-Front 30 passes the client's Internet domain and port address to the IW-DDCS component DDCS Main 50. DDCS-Main 50 then attempts to connect with the client's port address through an available Internet port 26 on the server 20. DDCS-Main 50 will not attempt to connect with the client using the dedicated Internet port 25. Once a secure connection between DDCS-Main 50 and the client is established, DDCS-Front 30 ceases communications with DDCS-Main 50 and the client. DDCS-Front resets to an idle state, 'listening' to the Internet 21, until a new request from the dedicated Internet port 25 is passed to DDCS-Front 30.

Both DDCS-Front 30 and DDCS-Main 50 are capable of handling multiple requests from multiple clients. Once a secure communication is developed between DDCS-Main 50 and a client, the port handling the transaction is dedicated to that communications session and will not be interrupted.

DDCS-Main 50 serves as the link between a client accessing the IW-DDCS by way of the Internet 21 and any field equipment 22 the IW-DDCS is monitoring or controlling. DDCS-Main 50 is capable of collecting data from the field equipment 22, controlling various components of the field equipment 22 and creating reports summarizing the data collected.

Figure 4:
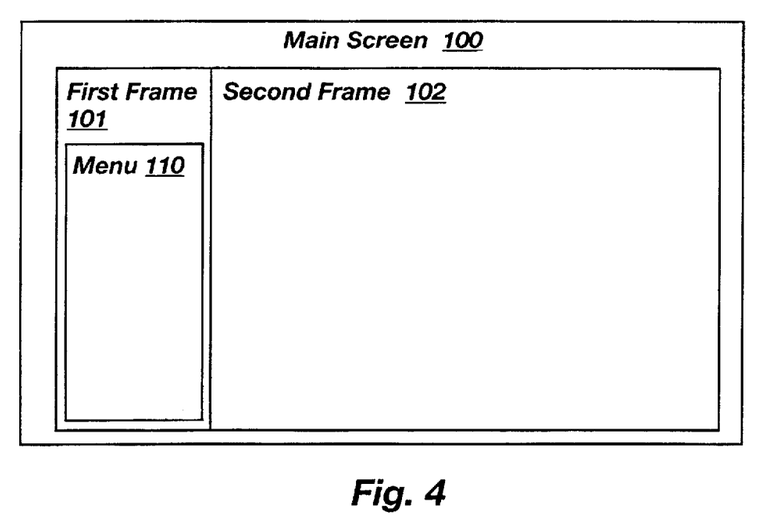
FIG. 4 is a block diagram illustrating the graphical user interface appearing on a client system during the execution of DDCS-Main.

FIG. 4 is a block diagram illustrating a preferred graphical user interface appearing on a client system during the execution of DDCS-Main 50.

After DDCS-Main 50 is initiated, DDCS-Main 50 offers the client a Main Screen 100 from which the client may choose one or more of the many functions of DDCS-Main 50. Typically, DDCS-Main 50 produces two frames within a client's web-browser Main Screen 100. The first frame 101 contains the Menu 110 comprising the choices available to the client. Selecting a choice implements the corresponding portion or function of DDCS-Main 50. Typically, the selected portion of DDCS-Main 50 executes a function which retrieves data, controls field equipment 22, or produces a report, and the results or queries are displayed in the second frame 102 of the Main Screen 100.

Web-browsers incapable of displaying separate frames, or clients who choose not to use frames, may view the Main Screen 100 in parts, where the Menu 110 is initially displayed on a display device of the client computer. Upon selection of a Menu 110 item, the displayed information will change according to the selection made and the Menu 110 may be replaced with the results of function executed by the Menu 110 function chosen.

Figure 5:
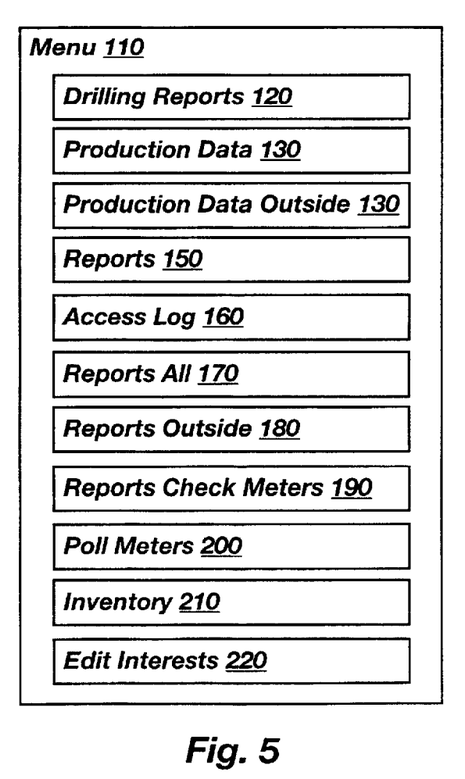
FIG. 5 is a block diagram illustrating the typical choices available to a client through the Menu.

The Menu 110 displays the selections of the applications available in DDCS-Main 50. Typically a client may select, thereby executing the applicable DDCS-Main 50 code section, one of the following selections: Drilling Reports 120, Production Data 130, Production Data Outside 140, Reports 150, Access Log 160, Reports All 170, Reports Outside 180, Reports Check Meters 190, Poll Meters 200, Inventory 210 and Edit Interests 220. Upon the selection of one of the Menu 110 choices, the corresponding DDCS-Main 50 code executes in the second frame 102, or in a separate display if frames are unavailable to the client.

Figure 6:
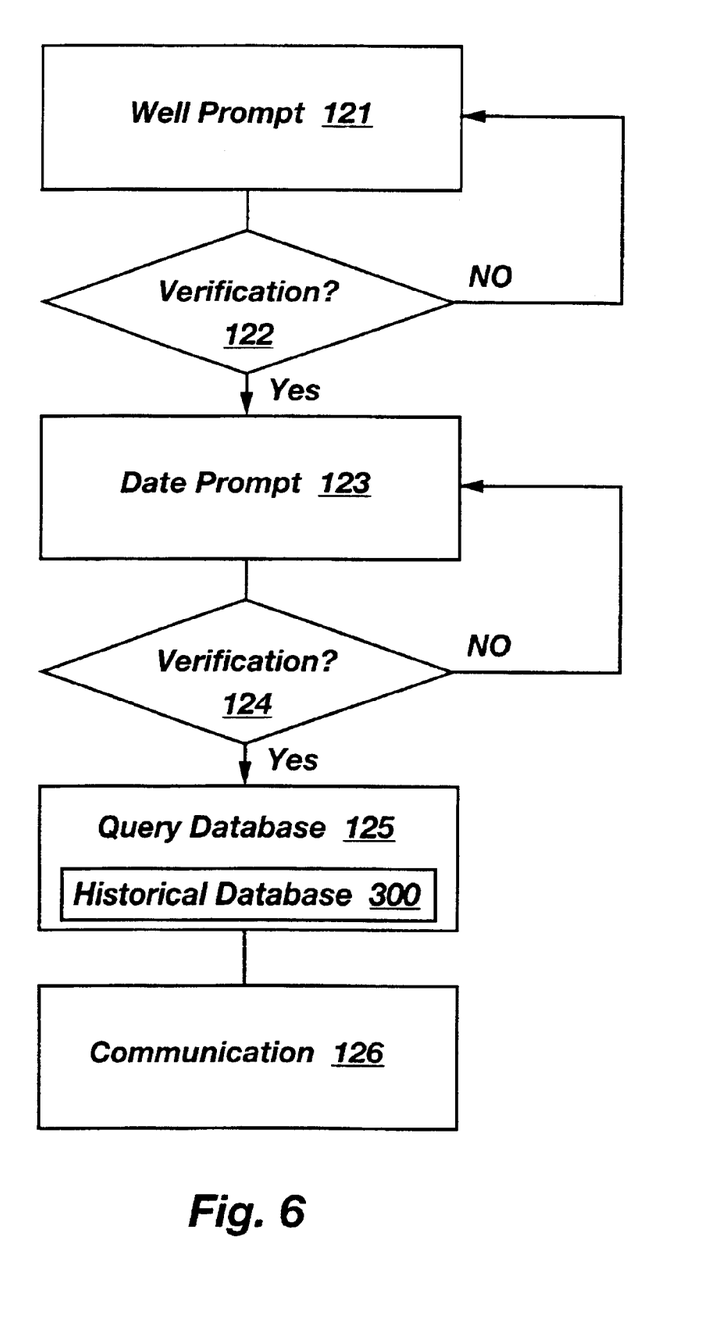
FIG. 6 is a block diagram illustrating the steps executed by DDCS-Main when the client chooses Drilling Reports from the Menu of the Main Screen.

FIG. 6 is a block diagram illustrating the steps executed by DDCS-Main 50 when a client chooses Drilling Reports 120 from the Menu 110 of the Main Screen 100. The Drilling Reports 120 component of DDCS-Main 50 produces a report specifying information about a specific well on a specific date or dates. Execution of the Drilling Reports 120 component of DDCS-Main 50 initiates a well prompt 121 prompting the client to enter the name or number of the particular well or wells for which the client wishes to obtain a report. Drilling Reports 120 may also include a listing of available wells for which data is available in order to help simplify the clients interaction with Drilling Reports 120. In addition, Drilling Reports 120 may disable access to certain wells based upon the amount of access the client is authorized to have. After receiving the well identification from the client, DDCS-Main 50 verifies the existence of the well 122. If the well identification is verified, a date prompt 123 is presented to the user, otherwise, the user is returned to the well prompt 122. The date prompt 123 requests the client to enter the date or dates for which they wish to obtain well data. Existence of data for the specified well on the specified date is also verified 124. If the date verification fails, the client is notified of the failure and is returned to the date prompt 123 and prompted to enter a new request. The verification procedure for the well prompt 121 and date prompt 123 may also be accomplished simultaneously. That is, a client may be prompted to enter both a well identifier and a date identifier prior to performing verification of the requests. Thus, the well verification 122 and date verification 124 steps would be performed following the well prompt 121 and date prompt 123. If either verification failed, the user would be returned to the well prompt 121 or date prompt 123 to make a new selection.

Verification of a proper well for a specified date prompts Drilling Reports 120 to query 125 a historical database 300 to obtain the information stored relating to the chosen well on the chosen date. The data is then communicated to the client 126 by way of DDCS-Main 50 and the Internet 21 in the second frame 102, or as a new display, of the Main Screen 100. The data typically presented in a Drilling Report includes well data, well activity data for a twenty-four hour period, equipment data, survey data, production data, and the like, as well as a cost report for the well on the date selected. Additional data, or data categories may also be displayed. Drilling Reports 120 may have the capability to read a database and distribute the information according to the fields within the database, or DDCS-Main 50 and Drilling Reports 120 may be customized to a particular database.

Selection of Production Data 130 from the Menu 110 of the Main Screen 100 executes the Production Data 130 component of DDCS-Main 50. The Production Data 130 component prompts DDCS-Main 50 to query both the historical database 300 and the field equipment 22 to obtain data for each well or for a selection of wells. For each well to which the client is allowed access, the data queried includes the well names, current operating pressure, differential pressure, flow rate, accumulated volume, volume of production the previous day, temperature, and the date and time of the last poll of the production data. As new control systems are added to the field equipment 22, additional data, such as any data which may be collected by the new control systems, may be integrated into the IW-DDCS system. The Production Data 130 component of DDCS-Main 50 processes the data and communicates the data by way of DDCS-Main 50 and the Internet 21 in a table type form to the second frame 102, or new display, of the Main Screen 100 on the client's system.

Selection of Production Data Outside 140 produces similar results to those achieved by the selection of Production Data 130. Data, such as well names, current operating pressure, differential pressure, flow rate, accumulated volume, volume of production the previous day, temperature, and the date and time of the last poll of the production data are queried for outside wells which are connected to the field equipment 22. Additionally, a report of the collected data is generated by the Production Data Outside 140 component of DDCS-Main 50 which is displayed on a client's system.

Selection of Reports 150 from Menu 110 prompts DDCS-Main 50 to create a report from specified data. The report, or reports, created by the Reports 150 component may be displayed on the client system, printed in hard-copy format, or saved as a file to storage media such as a floppy disc, hard disk drive, compact disc, digital video disk, or the like.

A report is defined by four basic parameters: the type of report, the group of wells covered in the report, the beginning date of the report and the end date of the report. Each of the foregoing parameters may be controlled by the client. Client selection of Reports 150 from the Menu 110 of the Main Screen 100 launches the Reports 150 component of DDCS-Main 50 which displays an interactive form within the second frame 102 of the Main Screen 100, or as a new display. The preferred interactive form prompts the user for the type of report, the group of wells to report on, the start date of the report and the end date of the report. The desired parameters are obtained from a report type list box, a group list box, a start date box and an end date box. In addition, well check boxes having a true and false state for each well group selected in the group list box are displayed on the interactive form. The interactive form also contains a report execution component, such as a command button, which, when selected, will cause the Reports 150 component of the DDCS-Main 50 to create a report based upon the selections on the interactive form.

The report type list box prompts the user to enter the type of report desired. Typically, the list box will contain a set of pre-formatted reports such as a daily report, an interest report, a pump report, or a gas balance report. Selection of the report execution component causes the Reports 150 component of DDCS-Main 50 to create a report of the type selected in the report type list box and display the report in the second frame 102, or new display, of the Main Screen 100. A daily report displays such information as the date of the report data, the identifications of the wells included in the report and the gas flow rates for each respective well. An interest report typically displays the dates covered by the report, the identifications of the wells included in the report, the amounts of production from each well for each party having an interest in the well on the specified date, and the total production of the well. A pump report displays the dates covered by the report, the well identifications, the pump production for the given time period, the temperatures of the gas in the pumps, and other data which is monitored at each pump. For each date included in a gas balance report, the total production for each selected well is listed with total productions from all of the wells for each day displayed as a single quantity, and broken down into the production for each party having an interest in the well. Typically, the described reports are displayed in tabular format. However, graphs showing such things as the production over time, or flow rates over a time period may also be displayed by the Reports 150 component of DDCS-Main 50. Alternatively, the client may construct unique report formats to display the data obtained by the Reports 150 component of the present invention.

Typically, the group list box contains a list of predefined well groups. Selection of a group of wells from the group list box selects the well check boxes in the selected group displayed by the Reports 150 component of DDCS-Main 50. Prior to selecting the report execution component, a client may individually choose which wells the report should cover by selecting the individual well check boxes. Selection of the report execution component causes the Reports 150 component of DDCS-Main 50 to produce a report for those wells whose well check boxes are selected. In the depicted embodiment, if no well check boxes are selected, the Reports 150 component of DDCS-Main 50 will produce a report covering all of the wells in the well group selected in the group list box.

Both the start date box and the end date box allow the client to enter the dates for which a report is desired. Entering the same date in both the start date box and the end date box produces a report for the date identified in the start date box only.

Selection of the report execution component of the Reports 150 component launches the report generating features of DDCS-Main 50. Reports 150 collects the selected report parameters—including the report type from the report type list box, the group of wells from the well group list box or from individually selected well check boxes, the start date from the start date box and the end date from the end date box—from the client at the time the Reports 150 component is selected. The Reports 150 component of DDCS-Main 50 uses the selected report parameters to perform a query of a historical database 300 containing the data for the selected wells during the time period specified by the report parameters. The Reports 150 component generates a report of the type specified based upon the queried data and displays the report in the second frame 102, or display, of the Main Screen 100. The client may save the report in electronic format or print the report.

In addition to the Reports 150 option appearing in the first frame 101 of the Main Screen 100, the following additional selections are available to the client: Reports All 170, Reports Outside 180, or Reports Check Meters 190. Each of these additional Reports selections allow the user to produce reports similar to the reports created by the Reports 150 component of DDCS-Main 50. Selection of Reports All 170 produces a report where the well group parameter is defaulted to produce a report for all of the wells available. Likewise, the Reports Outside 180 component of DDCS-Main 50 produces a report encompassing all of the outside wells monitored by the DDCS-Main 50 system. A report created by the Reports Check Meters 190 displays information on each of the various meters located at each well.

Individually, or used in combination, the report components of DDCS-Main 50 allow a client to produce reports detailing the operation and production data of each well monitored by DDCS-Main 50. The report components of DDCS-Main 50 also allow the client to obtain historical data about the client selected wells.

The Poll Meters 200 component of DDCS-Main 50 allows the client to poll the meter status of any of the oil or gas wells or fields being monitored or controlled by DDCS-Main 50. Polling occurs in real-time so that the client is provided with the most up-to-date data available. Where the Poll Meters 200 component is selected by the client, a list of possible parameters is displayed in the second frame 102, or display, of the Main Screen 100. These parameters include the type of polling function desired, the group of wells or meters to be polled, and individual choices (check boxes) for each set of meters at a well. The polling function is selected from a list of polling functions contained in a poll type list box. Likewise a well group list box provides the client with a list of possible well groups to be polled. As with the Reports 150 component, the client may also choose to poll the meters at individual well sites by choosing specific well check boxes. Once all of the parameters have been set by the client, a collection meters component may be selected which launches the Poll Meters 200 poll function.

The poll function of the Poll Meter 200 component of DDCS-Main 50 queries the meters at the selected wells and reports on their status based upon the parameters selected by the client. A typical poll returns the well name, the time the poll is performed by the Poll Meter 200, the date of the poll, the current flow rate at the meter, the current actual pressure at the meter, the current differential pressure at the meter, the current temperature at the meter, the total volume of product which passed through the meter the previous day, and the accumulated volume of flow through the meter. The results of each meter poll are displayed in the second frame 102 or display of the Main Screen 100 on the clients system. As with the Reports 150 component, the Poll Meter 200 polling function is capable of displaying data for individual or groups of wells. The unique advantage of the Poll Meters 200 component of DDCS-Main 50 is that process equipment and meters may be polled in real-time.

Although the typical poll has been described herein, the Poll Meter 200 component of DDCS-Main 50 is capable of polling and reporting on a multitude of different variables. Because the Poll Meter 200 component is dependent upon the data collection capability of meter or meters located at the well site, the Poll Meter 200 component may poll any variable monitored by the various meters at a well site. In addition, the Poll Meter 200 has the ability to perform predefined queries at specified times intervals, even when the client is not currently using the IW-DDCS. The results of such queries may be appended or saved to a historical database 300.

Based upon the information obtained by the Poll Meter 200 component, a client may dynamically control the valves which control the gas or oil flow at a well site or within a pipeline system. Through the valve control component of Poll Meter 200, the client may open and close valves within the monitored system thereby controlling the flow of gas or oil through the system. The valve control component of the Poll Meter 200 interacts directly with any valve within the system having the ability to be controlled. If a client desires to adjust a piece of field equipment the valve control component of Poll Meter 200 may be selected, allowing the client to send control commands through DDCS-Main 50 and the server 20 to field equipment. Thus, control operations may be monitored and controlled from a location distant from the actual field equipment.

The Inventory 210 component of DDCS-Main 50 allows a client to inventory the wells monitored and controlled by DDCS-Main 50. The inventory of the wells and meters under DDCS-Main 50 control are displayed in the second frame 102, or display, of the Main Screen 100.

The Edit Interests 220 component of DDCS-Main 50 allows a client to add, edit and remove field equipment 22 components from the control, monitoring, or data collection of DDCS-Main 50. Upon selection, the Edit Interests 220 component of DDCS-Main 50 displays a series of check boxes and input boxes within the second frame 102, or display, of the Main Screen 100. A single series consists of a check box and a plurality of input boxes. Access to the Edit Interests 220 component allows a client to add new equipment definitions to each well or edit the existing definitions. Alternatively, the client may also be allowed to edit the reporting and data collection features of DDCS-Main 50.

Having thus described certain preferred embodiments of the present invention, it is to be understood that the invention defined by the appended claims is not to be limited by particular details set forth in the above description, as many apparent variations thereof are possible without departing from the spirit or scope thereof as hereinafter claimed.

What is claimed is:

1. A computer implemented method for monitoring, controlling, and managing the daily operations and activities of an oilfield and its wells using a client computer, having at least a CPU, a display device, and an input device, and a server computer implementing said computer implemented method, comprising:

establishing a connection between a client computer and a server computer having said computer implemented method operating on said server;

authenticating access to said computer implemented method;

providing the client computer access to a polling process;

providing the client computer access to a control process;

providing the client computer access to a reporting process; and controlling field equipment of at least one oilfield well wherein authenticating access to said computer implemented method further comprises:

displaying a location for entry of a user name on the client computer;

displaying a location for entry of a password on the client computer;

displaying an authentication execution object on the client computer;

retrieving said user name and said password from the client computer upon execution of said authentication execution object;

validating said user name to at least one validation name stored on said server computer;

validating said password to at least one validation password corresponding to said one validation name stored on said server computer;

establishing a level of use based upon said at least one validated password;

disconnecting said established connection between said client computer and said server computer running said computer implemented method; and re-establishing a connection between the client computer and said server computer using a dedicated port on said server computer where said user name is validated and said password is validated.

2. The computer implemented method of claim 1 wherein a connection established between the client computer and said server computer is a connection by way of an internet.

3. The computer implemented method of claim 1 wherein said step of providing the client computer access to a reporting process comprises providing the client computer access to historical data for each well monitored and controlled by the computer implemented method.

4. The computer implemented method of claim 1 wherein the step of providing the client computer access to a reporting process comprises:
   displaying report criteria entry locations on the client computer for entry of desired report parameters;
   retrieving said report parameters from the client computer;
   creating a report with data within said report parameters; and
   displaying said report on the client computer.

5. A computer implemented method for monitoring, controlling, and managing the daily operations and activities of an oilfield and its wells using a client computer, having at least a CPU, a display device, and an input device, and a server computer implementing said computer implemented method, comprising:
   establishing a connection between a client computer and a server computer having said computer implemented method operating on said server;
   authenticating access to said computer implemented method;
   providing the client computer access to a polling process;
   providing the client computer access to a control process;
   providing the client computer access to a reporting process; and
   controlling field equipment of at least one oilfield well wherein said polling process comprises:
      displaying a well list on the client computer having at least one oil well definition;
      displaying a poll type on the client computer having at least one type definition;
      displaying a poll execution object on the client computer;
      receiving a selected well definition from said well list upon execution of said poll execution object;
      receiving a selected type definition from said type list upon execution of said poll execution object;
      creating a query based upon said well definition and said type definition received from the client computer;
      monitoring at least one piece of field equipment;
      retrieving data corresponding to said query from field equipment monitored by said computer implemented method; and
      displaying said data corresponding to said query on the client computer.

6. The computer implemented method of claim 5 wherein displaying said well list on the client computer further comprises:
   displaying at least one well name for a selected well definition included in said well list on the client computer; and
   displaying a selection object corresponding to each of said displayed well names, said selection object having a true or false state.

7. The computer implemented method of claim 6 wherein receiving a selected well definition from said well list includes receiving said well name corresponding to each selection object having a true state upon execution of said poll execution object.

8. The computer implemented method of claim 6 wherein retrieving data corresponding to said query from field equipment includes retrieving data for each well name corresponding to a selection object having a true state upon execution of said poll execution object.

9. The computer implemented method of claim 5 wherein said retrieved data corresponding to said query includes a well name, a time of query, a date of query, a current flow rate, a current actual pressure, a current differential pressure, a current temperature, a total production volume for the previous day, and an accumulated production volume for the year.

10. The computer implemented method of claim 5 wherein said step of providing the client computer access to a reporting process comprises providing the client computer access to historical data for each well monitored and controlled by the computer implemented method.

11. The computer implemented method of claim 5 wherein the step of providing the client computer access to a reporting process comprises:
    displaying report criteria entry locations on the client computer for entry of desired report parameters;
    retrieving said report parameters from the client computer;
    creating a report with data within said report parameters; and
    displaying said report on the client computer.

12. The computer implemented method of claim 5 wherein a connection established between the client computer and said server computer is a connection by way of an internet.

13. The computer implemented method of claim 5 wherein the step of providing the client computer access to a reporting process further comprises:
    displaying a report type list on the client computer for selecting the type of data desired in a report;
    displaying a well list on the client computer for selecting at least one well to include in said report;
    displaying a start date location on the client computer for entry of a start date;
    displaying an end date location on the client computer for entry of an end date;
    displaying a report execution object on the client computer;
    retrieving the selected report type from the report type list upon execution of said report execution object;
    retrieving the selected well from the well list upon execution of said report execution object;
    retrieving the start date entered in said start date location upon execution of said report execution object;
    retrieving the end date entered in said end date location upon execution of said report execution object;
    creating a query based upon the retrieved said selected report type, said selected well, said start date and said end date;
    posting said query to a database containing the information necessary to respond to said query;
    retrieving a result to said query from said database; and
    displaying said result on the client computer.

14. A computer implemented method for monitoring, controlling, and managing the daily operations and activities of an oilfield and its wells using a client computer, having at least a CPU, a display device, and an input device, and a server computer implementing said computer implemented method, comprising:
    establishing a connection between a client computer and a server computer having said computer implemented method operating on said server;

authenticating access to said computer implemented method;

providing the client computer access to a polling process;

providing the client computer access to a control process;

providing the client computer access to a reporting process; and controlling field equipment of at least one oilfield well wherein the step of providing the client computer access to a reporting process further comprises:

displaying a report type list on the client computer for selecting the type of data desired in a report;

displaying a well list on the client computer for selecting at least one well to include in said report;

displaying a start date location on the client computer for entry of a start date;

displaying an end date location on the client computer for entry of an end date;

displaying a report execution object on the client computer;

retrieving the selected report type from the report type list upon execution of said report execution object;

retrieving the selected well from the well list upon execution of said report execution object;

retrieving the start date entered in said start date location upon execution of said report execution object;

retrieving the end date entered in said end date location upon execution of said report execution object;

creating a query based upon the retrieved said selected report type, said selected well, said start date and said end date;

posting said query to a database containing the information necessary to respond to said query;

retrieving a result to said query from said database; and     displaying said result on the client computer.

\* \* \* \* \*